United States Patent
Spigner

(10) Patent No.: US 11,801,792 B2
(45) Date of Patent: Oct. 31, 2023

(54) UNIVERSAL VEHICLE STEP

(71) Applicant: Kenneth Spigner, Ratliff City, OK (US)

(72) Inventor: Kenneth Spigner, Ratliff City, OK (US)

(73) Assignee: Kenneth Spigner, Ratliff City, OK (US)

( * ) Notice: Subject to any disclaimer, the term of this patent is extended or adjusted under 35 U.S.C. 154(b) by 399 days.

(21) Appl. No.: 17/094,774

(22) Filed: Nov. 10, 2020

(65) Prior Publication Data
US 2022/0144173 A1    May 12, 2022

(51) Int. Cl.
*B60R 3/00* (2006.01)
*B60D 1/58* (2006.01)
*B60D 1/52* (2006.01)

(52) U.S. Cl.
CPC ................ *B60R 3/007* (2013.01); *B60D 1/58* (2013.01); *B60D 1/52* (2013.01)

(58) Field of Classification Search
CPC .............. B60R 3/007; B60D 1/58; B60D 1/52
See application file for complete search history.

(56) References Cited

U.S. PATENT DOCUMENTS

| | | | | |
|---|---|---|---|---|
| 5,738,362 A * | 4/1998 | Ludwick | ................... | B60R 3/02 |
| | | | | 280/166 |
| 5,803,330 A * | 9/1998 | Stack | ...................... | B60R 9/048 |
| | | | | 224/519 |
| 5,884,930 A * | 3/1999 | Cluth | ....................... | B60D 1/52 |
| | | | | 224/521 |
| 6,179,311 B1 * | 1/2001 | Larkin | ................. | B62D 25/188 |
| | | | | 280/154 |
| 6,511,086 B2 * | 1/2003 | Schlicht | ..................... | B60R 3/02 |
| | | | | 280/166 |
| 6,769,704 B2 * | 8/2004 | Cipolla | ................... | B60R 3/007 |
| | | | | 224/521 |
| 6,971,663 B1 * | 12/2005 | Blake | ....................... | B60D 1/60 |
| | | | | 280/155 |
| 7,185,904 B1 * | 3/2007 | Jones | ........................ | B60R 9/06 |
| | | | | 280/166 |
| 8,851,495 B1 * | 10/2014 | Masanek, Jr. | ............ | B60R 3/007 |
| | | | | 280/166 |
| 9,487,146 B1 * | 11/2016 | Lowell | ..................... | B60R 3/007 |
| 9,533,621 B1 * | 1/2017 | Rees | ........................ | B60R 3/002 |

(Continued)

FOREIGN PATENT DOCUMENTS

| | | | | |
|---|---|---|---|---|
| CA | 3055357 A1 * | 4/2020 | ............ | B60R 3/007 |
| EP | 3929036 A1 * | 12/2021 | ............... | B60D 1/06 |
| WO | WO-0240335 A1 * | 5/2002 | ............... | B60D 1/60 |

*Primary Examiner* — Jacob B Meyer

(74) *Attorney, Agent, or Firm* — DUNLAP CODDING, P.C.

(57) ABSTRACT

An article of manufacture for providing a universal auto step for a vehicle hitch has an attachable step, and a hitch drawbar having a shaft and a lock to a hitch receiver. The attachable step includes a top surface having a front edge, a rear edge, a left-side edge and a right-side edge, a set of side members coupled to the front side edge, the left-side edge, and the right-side edge, the set of side members oriented perpendicular and downward from the top surface, and an attachment tab coupled to the rear edge and extending downward. The top surface rests upon a top surface of the hitch drawbar when coupled to the hitch drawbar.

7 Claims, 6 Drawing Sheets

(56) References Cited

U.S. PATENT DOCUMENTS

| | | | | |
|---|---|---|---|---|
| 10,099,620 B1* | 10/2018 | Sgroi | ................. | B60R 3/00 |
| 10,464,491 B1* | 11/2019 | Masanek, Jr. | ............ | B60D 1/58 |
| D881,078 S * | 4/2020 | Rebick | ................. | B60D 1/58 |
| | | | | D12/162 |
| 11,007,832 B1* | 5/2021 | Rebick | ................. | B60D 1/52 |
| 11,370,361 B1* | 6/2022 | Rosario Gonzales | ... | B60D 1/42 |
| 11,376,904 B2* | 7/2022 | Fuller | ................. | B60R 9/06 |
| 2003/0116938 A1* | 6/2003 | Shields | ................. | B60R 3/007 |
| | | | | 280/166 |
| 2004/0256833 A1* | 12/2004 | Cervenka | ................. | B60R 3/007 |
| | | | | 280/163 |
| 2006/0082095 A1* | 4/2006 | Knittel | ................. | B60R 3/007 |
| | | | | 280/163 |
| 2006/0170179 A1* | 8/2006 | Dahl | ................. | B60R 3/02 |
| | | | | 280/163 |
| 2007/0052206 A1* | 3/2007 | Ezra | ................. | B60D 1/58 |
| | | | | 280/506 |
| 2008/0111347 A1* | 5/2008 | Tunno | ................. | B60D 1/52 |
| | | | | 280/504 |
| 2012/0299266 A1* | 11/2012 | Gordon | ................. | B60D 1/58 |
| | | | | 280/163 |
| 2012/0313343 A1* | 12/2012 | Fletcher | ................. | B60D 1/58 |
| | | | | 280/164.1 |
| 2014/0054874 A1* | 2/2014 | Masanek, Jr. | ............ | B60D 1/36 |
| | | | | 280/477 |
| 2015/0084304 A1* | 3/2015 | Mendoza | ................. | B60R 3/02 |
| | | | | 280/163 |
| 2018/0037166 A1* | 2/2018 | Hunter | ................. | B60R 3/007 |
| 2018/0117979 A1* | 5/2018 | Columbia | ................. | B60D 1/52 |
| 2018/0265007 A1* | 9/2018 | Good | ................. | B60R 3/007 |
| 2021/0129758 A1* | 5/2021 | Wymore | ................. | B60R 3/02 |
| 2021/0261060 A1* | 8/2021 | Schwarz | ................. | B60D 1/52 |
| 2022/0111796 A1* | 4/2022 | Klein | ................. | B60D 1/58 |
| 2022/0144173 A1* | 5/2022 | Spigner | ................. | B60D 1/58 |

* cited by examiner

UNIVERSAL VEHICLE STEP

TECHNICAL FIELD

This application relates in general to an article of manufacture for providing a motor vehicle aid, and more specifically, to an article of manufacture for a universal auto step for a vehicle hitch.

BACKGROUND

In 2019 alone, nearly 13 million light- and heavy-duty trucks were sold in the United States. Many of these trucks left the showroom floor with towing packages that contained a vehicle hitch. Other buyers installed hitches after their truck purchase. A hitch drawbar is a standard drawbar that engages a hitch receiver to allow a hitch to be coupled to the vehicle. The drawbar and receiver typically are available in 1¼", 2", 2½", and 3" sizes. A step allows a person to stand near the hitch to climb on the truck and/or reach into the truck's flatbed, but there isn't one step to easily fit the various sizes, potentially causing buying confusion when a truck owner wants to add a step to the rear of the truck.

Therefore, a need exists for an article of manufacture for providing a universal auto step for a vehicle hitch. The present invention attempts to address the limitations and deficiencies in prior solutions according to the principles and example embodiments disclosed herein.

SUMMARY

In accordance with the present invention, the above and other problems are solved by providing an article of manufacture for a universal auto step for a vehicle hitch according to the principles and example embodiments disclosed herein.

In one embodiment, the present invention is an article of manufacture for providing a universal auto step for a vehicle hitch. The universal auto step has an attachable step, and a hitch drawbar having a shaft and a lock to a hitch receiver. The attachable step includes a top surface having a front edge, a rear edge, a left-side edge and a right-side edge, a set of side members coupled to the front side edge, the left-side edge, and the right-side edge, the set of side members oriented perpendicular and downward from the top surface, and an attachment tab coupled to the rear edge and extending downward. The top surface rests upon a top surface of the hitch drawbar when coupled to the hitch drawbar.

In another aspect of the present disclosure, the attachment tab comprises an attachment tab surface and a receiving hole.

In another aspect of the present disclosure, the receiving hole is a square sized to match the shaft of the hitch drawbar.

In another aspect of the present disclosure, the shaft of the hitch drawbar and the receiving hole comprise 1¼", 2", 2½", and 3" size squares.

In another aspect of the present disclosure, the top surface has a plurality of drain holes.

In another aspect of the present disclosure, the set of side members, and the attachment tab are made of steel that are welded together.

The foregoing has outlined rather broadly the features and technical advantages of the present invention in order that the detailed description of the invention that follows may be better understood. Additional features and advantages of the invention will be described hereinafter that form the subject of the claims of the invention.

It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

Referring now to the drawings in which like reference numbers represent corresponding parts throughout.

DETAILED DESCRIPTION

Figure 1:
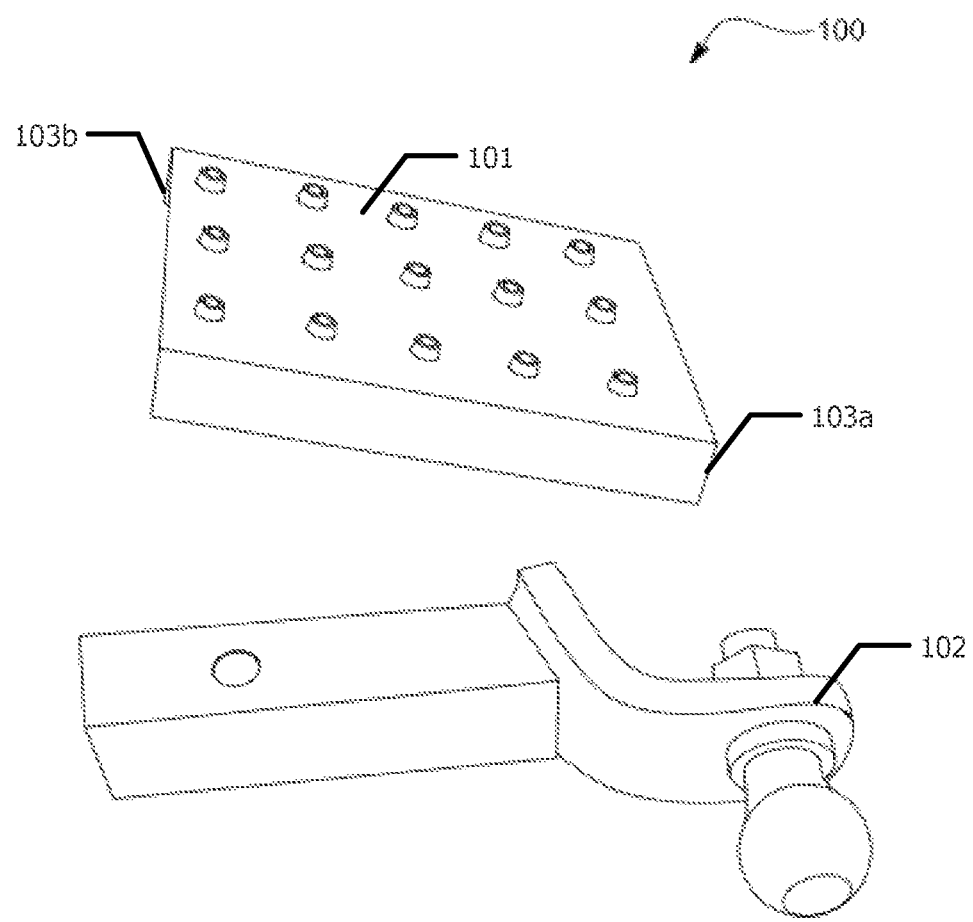
FIG. 1 illustrates an example embodiment of an article of manufacture providing a universal auto step for a vehicle hitch according to the present invention.

This application relates in general to an article of manufacture for providing a motor vehicle aid, and more specifically, to an article of manufacture for providing a universal auto step for a vehicle hitch according to the present invention.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

In describing embodiments of the present invention, the following terminology will be used. The singular forms "a," "an," and "the" include plural referents unless the context clearly dictates otherwise. Thus, for example, reference to "a needle" includes reference to one or more of such needles and "etching" includes one or more of such steps. As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. As used herein, the singular forms "a," "an," and "the" are intended to include the plural forms as well, unless the context clearly indicates otherwise.

It further will be understood that the terms "comprises," "comprising," "includes," and "including" specify the presence of stated features, steps or components, but do not preclude the presence or addition of one or more other features, steps or components. It also should be noted that in some alternative implementations, the functions and acts noted may occur out of the order noted in the figures. For example, two figures shown in succession may in fact be executed substantially concurrently or may sometimes be executed in the reverse order, depending upon the functionality and acts involved.

The terms "driver," and "user" refer to an entity, e.g. a human, using the universal auto step for a vehicle hitch associated with the invention. The term user herein refers to one or more users.

The term "invention" or "present invention" refers to the invention being applied for via the patent application with the title "Universal Vehicle Step." Invention may be used interchangeably with hitch step.

In general, the present disclosure relates to an article of manufacture for providing a universal auto step for a vehicle hitch. To better understand the present invention, FIG. 1 illustrates an example embodiment of an article of manufacture providing a universal auto step for a vehicle hitch according to the present invention. A universal vehicle step 100 is shown on a pickup truck tailgate comprising an attachable step 100 and a hitch drawbar 102. The attachable step 100 has a top surface 101 and side members 103 directed downward. The side members 103 may be located on a front edge and each of the two sides 103a-b. The top surface 101 of the universal vehicle step 100 also has a plurality of drain holes across its surface that are shown as being raised slightly upward to provide a traction surface for a driver when standing upon the universal vehicle step 100.

The hitch drawbar 102 is a standard drawbar that engages a hitch receiver (not shown) to allow the hitch to be coupled to the vehicle. The drawbar and receiver are typically available in 1¼", 2", 2½", and 3" sizes. A universal vehicle step 100 may be made to mate with one of these sized drawbars as disclosed herein.

Figure 2:
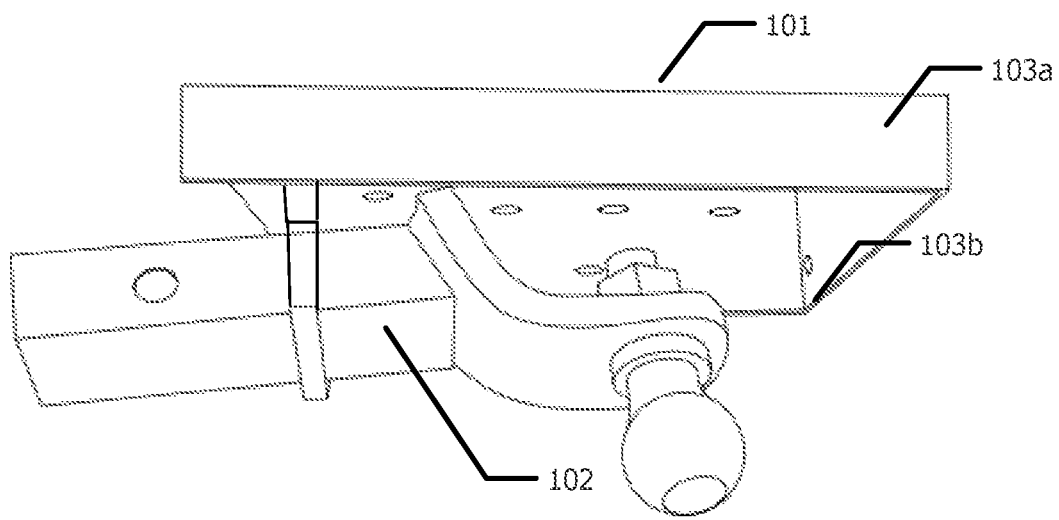
FIG. 2 illustrates another view of an article of manufacture for providing a universal auto step for a vehicle hitch according to the present invention.

FIG. 2 illustrates another view of an article of manufacture for providing a universal auto step for a vehicle hitch according to the present invention. The universal vehicle step 100 is shown coupled to the hitch drawbar 102 in which the drawbar 102 is oriented along a centerline of an underside of the universal vehicle step 100. One of the sides 103a of the universal vehicle step 100 is shown directly below the top surface 101 as the top surface extends outward from its connection to the hitch drawbar 102.

Figure 3:
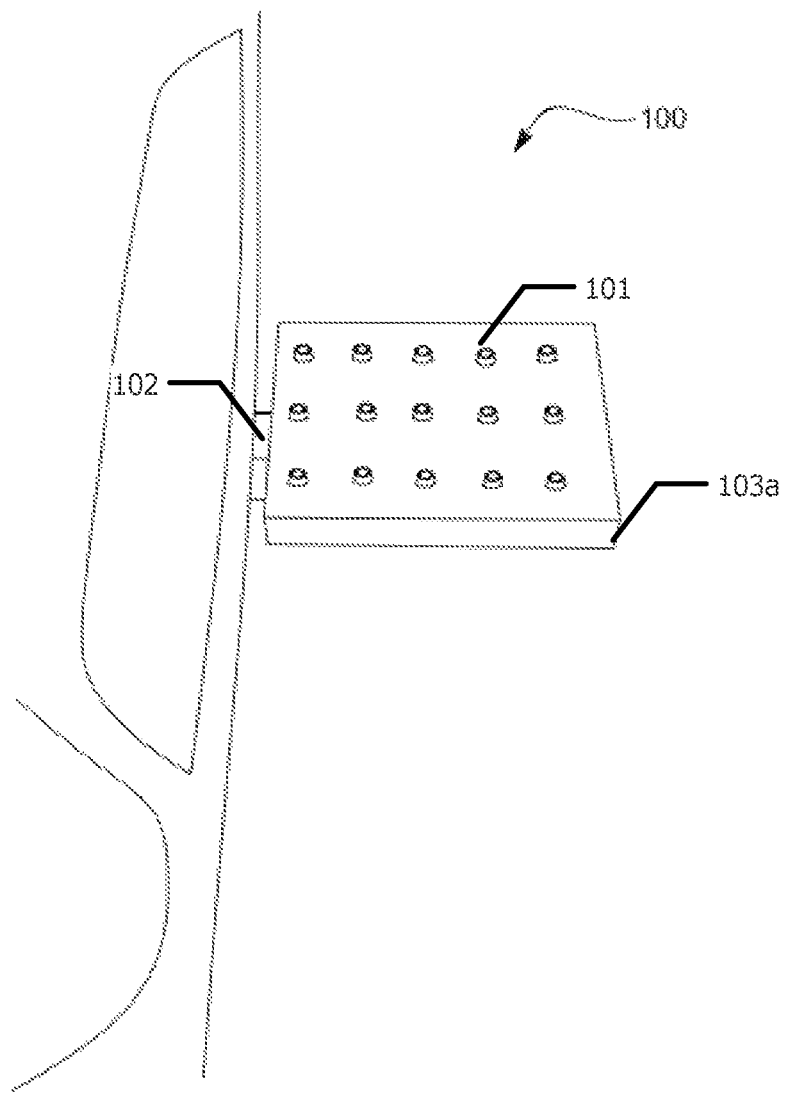
FIG. 3 illustrates an example embodiment of an article of manufacture providing a universal auto step for a vehicle hitch attached to a vehicle according to the present invention.
Figure 4:
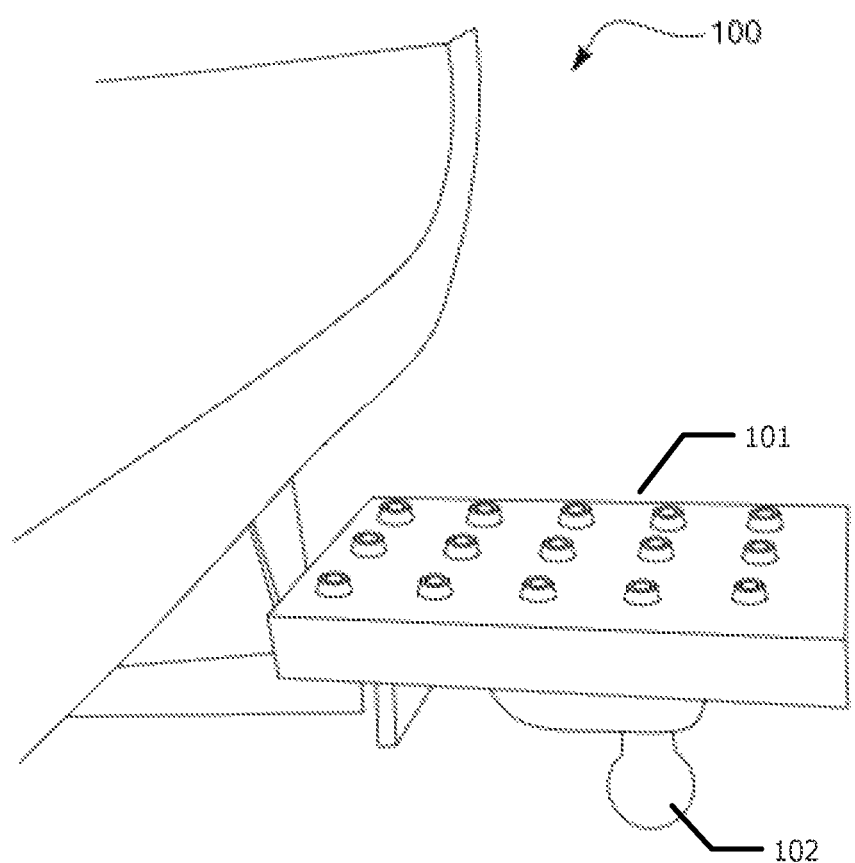
FIG. 4 illustrates another view of an article of manufacture for providing a universal auto step for a vehicle hitch attached to a vehicle according to the present invention

FIGS. 3 and 4 illustrate an example embodiment of an article of manufacture providing a universal auto step for a vehicle hitch attached to a vehicle according to the present invention. The universal vehicle step is shown from a top view in FIG. 3 and a side view in FIG. 4 in which the universal vehicle step 100 is coupled to the hitch drawbar 102 that has been inserted into and locked into a hitch receiver 301. The universal vehicle step 100 rests on top of a shaft of the hitch drawbar 102 so that it may be oriented with the top surface 101 parallel to the ground. When attached to the vehicle hitch as shown herein, the top surface 101 provides a level and stable step for a driver to use when climbing onto the vehicle.

Figure 5:
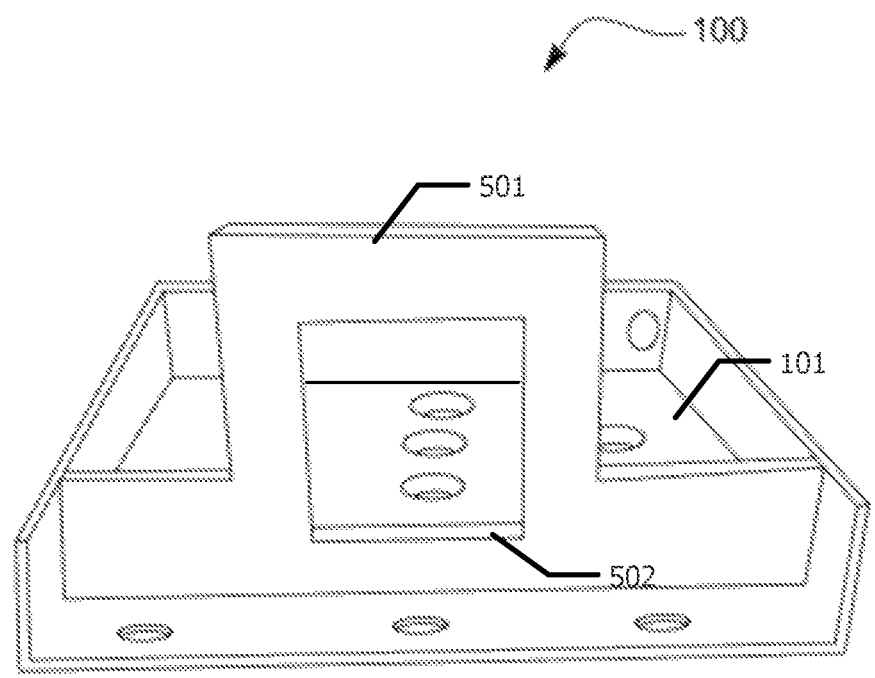
FIG. 5 illustrates a front view of an underside of an example embodiment of an article of manufacture providing a universal auto step for a vehicle hitch according to the present invention.
Figure 6:
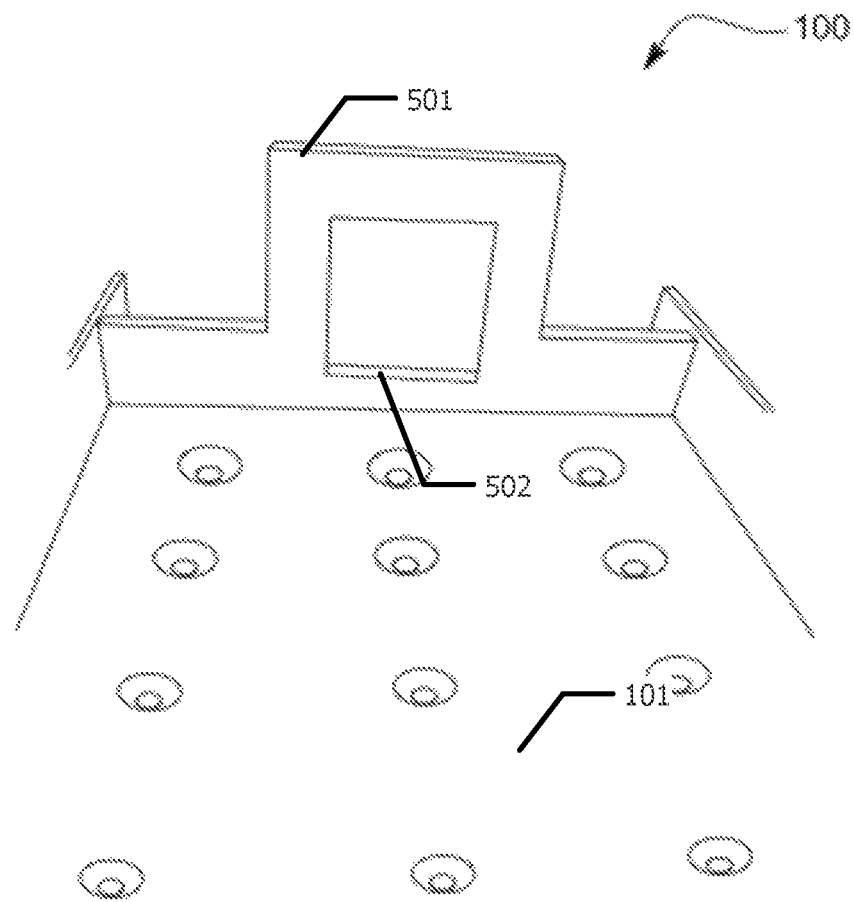
FIG. 6 illustrates a rear view of an underside of an article of manufacture for providing a universal auto step for a vehicle hitch according to the present invention.

FIGS. 5 and 6 illustrate a front and rear view of an underside of an example embodiment of an article of manufacture providing a universal auto step for a vehicle hitch according to the present invention. FIG. 5. shows the underside of the universal vehicle step 100 as viewed from a front edge toward a rear edge. The two sides 103 a-b are shown extending from the top surface 101 on opposite sides of the top surface 101. At the back end of the top surface, an attachment tab 501 is coupled to the underside of the top surface 101 of the universal vehicle step 100. The attachment tab 502 extends downward from the top surface 101 for a sufficient distance to engage the hitch drawbar 102 (not shown).

A receiving hole 502 is located within the center an attachment tab surface of the attachment tab 501 and is sized to mate with the hitch drawbar 102. The receiving hole 502 is sized to match the surfaces of the drawbar and match the size of the hitch receiver 301. The edges of the receiving hole 502 engage the sides of the hitch drawbar 102 preventing the universal vehicle step 100 from rotating about the drawbar 102 when the step 100 is attached thereto. The attachment tab 501 and its receiving hole 502 are positioned on an inward side of the universal vehicle step 100 when it is attached to the hitch drawbar 102. The attachment tab 501 and its receiving hole 502 permit the hitch drawbar to be positioned underneath the top surface 101 permitting the entire universal vehicle step 100 to rest on top of the hitch drawbar 102 when in use. The shape of the receiving hole 502 matching the shape of the hitch drawbar 102 prevents the universal vehicle step 100 from rotating about the hitch drawbar 102 when a driver uses the step to climb onto the vehicle.

The example embodiment of the universal vehicle step 100 are made of steel that has been bent into shape and welded together into a solid object. The universal vehicle step 100 also may be made from steel. The universal vehicle step 100 may have its top surface 101 sized to provide a step that is as long and as wide as desired. The size of the step 100 is limited by the strength of the top surface and it cantilevers off of the hitch drawbar 102 as the size of the top surface 101 increases.

Even though particular combinations of features are recited in the present application, these combinations are not intended to limit the disclosure of the invention. In fact, many of these features may be combined in ways not specifically recited in this application. In other words, any of the features mentioned in this application may be included to this new invention in any combination or combinations to allow the functionality required for the desired operations.

No element, act, or instruction used in the present application should be construed as critical or essential to the invention unless explicitly described as such. Further, the phrase "based on" is intended to mean "based, at least in part, on" unless explicitly stated otherwise.

What is claimed is:

1. In combination, an article of manufacture for providing a universal auto step and a vehicle hitch having a drawbar coupled to a ball hitch having a ball, the drawbar comprising a shaft having a top surface and a bottom surface, the ball of the ball hitch extending from the bottom surface, the article comprising:

an attachable step, the attachable step comprising:
a top surface having a front edge, a rear edge, a left-side edge, a right-side edge, and an underside;

and an attachment tab coupled to the underside at the rear edge and extending downward, the attachment tab having a receiving hole receiving the drawbar;

wherein the underside of the top surface faces the top surface of the shaft of the hitch drawbar, and the top surface of the attachable step extends over the ball hitch.

2. The combination according to claim 1, wherein the attachment tab comprises an attachment tab surface.

3. The combination according to claim 1, wherein the receiving hole is a square sized to match the shaft of the hitch drawbar.

4. The combination according to claim 3, wherein the shaft of the hitch drawbar and the receiving hole comprise 1¼", 2", 2½", or 3" size squares.

5. The combination according to claim 3, wherein the top surface has a plurality of drain holes.

6. The combination according to claim 3, further comprising a set of side members coupled to the front side edge, the left side edge, and the right side edge, the set of side members oriented perpendicular and downward from the top surface, wherein the top surface, the set of side members, and the attachment tab are made of steel that are welded together.

7. The combination of claim 1, wherein the ball hitch further comprises a threaded shaft, and wherein the underside of the top surface faces the threaded shaft.

\* \* \* \* \*